United States Patent [19]
Juranovic et al.

[11] Patent Number: 5,536,162
[45] Date of Patent: Jul. 16, 1996

[54] APPARATUS FOR PREPARING PRETZEL CHIPS

[75] Inventors: Lillian R. Juranovic, Irving, Tex.; Paul V. Tuzzio, North Canton, Ohio

[73] Assignee: Recot, Inc., Plano, Tex.

[21] Appl. No.: 483,891

[22] Filed: Jun. 7, 1995

Related U.S. Application Data

[62] Division of Ser. No. 144,026, Nov. 1, 1993.

[51] Int. Cl.$^6$ ..................................... B29C 47/12
[52] U.S. Cl. ..................... 425/462; 425/461; 425/467
[58] Field of Search ................................ 425/197, 461, 425/462, 467

[56] References Cited

U.S. PATENT DOCUMENTS

| | | | |
|---|---|---|---|
| D. 323,232 | 1/1992 | Duffy | D1/125 |
| 2,419,654 | 4/1927 | Moore | 425/461 |
| 2,613,620 | 10/1952 | Allen | 170/54 |
| 3,241,503 | 3/1966 | Schafer . | |
| 3,551,165 | 12/1970 | Reesman et al. | 99/81 |
| 3,799,724 | 3/1974 | Grady . | |
| 4,343,604 | 8/1982 | Minjolle | 425/192 R |
| 4,743,191 | 5/1988 | Choa | 425/190 |
| 4,759,939 | 7/1988 | Keller et al. . | |
| 4,789,555 | 12/1988 | Judd | 426/503 |
| 4,839,120 | 6/1989 | Baba et al. | 264/102 |
| 4,937,089 | 6/1990 | Ikoma et al. | 426/574 |
| 4,979,889 | 12/1990 | Frost | 425/192 R |
| 5,238,693 | 8/1993 | Walsh | 426/466 |

FOREIGN PATENT DOCUMENTS

| | | |
|---|---|---|
| 338239 | 10/1989 | European Pat. Off. . |
| 61-61822 | 3/1986 | Japan . |
| 2183439 | 10/1986 | United Kingdom . |
| 2199228 | 7/1988 | United Kingdom . |

*Primary Examiner*—James P. Mackey
*Attorney, Agent, or Firm*—Rothwell, Figg, Ernst & Kurz

[57] ABSTRACT

A novel pretzel chip is produced by extruding pretzel dough to form a dough extrudate comprising concentric dough rings that are interconnected and partially fused. The extrudate is sliced, and the slices are cooked following conventional pretzel cooking procedures. The dough is extruded through a die than includes a dough inlet having a plurality of metering passages arranged in concentric circles, a die interior comprised of a dough passageway containing a plurality of arcuate divider walls arranged in concentric circles, with each of the arcuate divider walls comprised of a base portion affixed to the dough inlet and a tip portion that is recessed from a dough exit port.

10 Claims, 3 Drawing Sheets

APPARATUS FOR PREPARING PRETZEL CHIPS

This is a divisional of application Ser. No. 08/144,026, filed Nov. 1, 1993.

BACKGROUND OF THE INVENTION

1. Field of the Invention

This invention relates to snack chips and processes for making the same. More particularly, this invention provides a process for producing pretzel chips of a novel configuration by extruding and thinly slicing a pretzel dough. This invention also provides a novel extrusion die for extruding pretzel or other doughs into the desired configuration.

2. Description of the Related Art

Pretzels have long been a popular snack food, and have been produced in various shapes and designs. In addition to being prepared in the conventional pretzel knot, rod and stick shapes, pretzels have been produced in the shape of novelty designs, such as butterflies, the letter "B" and corporate logos. Pretzels also have been produced in the shape of chips.

A commercial pretzel chip product, sold as the Mr. Phipps-brand pretzel chip, has a flat, sheeted appearance much like a cracker with docking holes. The chip also has the typical brown color of a pretzel, and a crisp texture.

The basic parameters of pretzel making are well known. Various extrusion and/or molding techniques have been used to produce pretzels of a desired shape. The color and texture of pretzels typically are produced by partially cooking the pretzel dough shapes in a caustic hot water bath, following which the product is salted with the desired amount of salt and baked.

Other food products in the shape of a chip, and extrusion processes for preparing such food products, also are known. See, U.S. Design Pat. No. 323,232 to Duffy; U.S. Pat. No. 4,789,555 to Judd; U.S. Pat. No. 3,551,165 to Reesman, et al.; U.S. Pat. No. 2,613,620 to Allen; U.S. Pat. No. 4,937,089 to Ikoma, et al.; British Patent published application 2,183,439; and Japanese Kokai published application 61-61822. The chips disclosed in these references are of varied design, with the processes disclosed therein designed especially for preparing the particular products disclosed. As evidenced by the variety of products disclosed in the above references, the art is always seeking new designs to differentiate a new product from existing products.

Accordingly, an object of this invention is a process for producing a pretzel chip having a distinctive design. It also is an object to produce a design which is not only appealing to consumers, but also strong enough to maintain its integrity through the production, packaging and distribution processes.

SUMMARY OF THE INVENTION

The foregoing and other objects of the present invention are realized via a process for preparing a pretzel chip, comprising the steps of extruding a pretzel dough to form a dough extrudate comprised of a plurality of interconnected and partially fused concentric dough rings, slicing the dough extrudate to provide a plurality of dough slices and cooking the dough slices.

In a preferred process, the extrudate is prepared by extruding the dough through a die having a dough entry port having a plurality of metering passages disposed in concentric circles. The interior of the die includes a plurality of arcuate divider walls, disposed in a generally concentric circular arrangement, which extend from the distal ends of the metering channels to a dough exit port. Concentric rings of pretzel dough form and partially fuse in the interior of the die around the arcuate divider walls, and the provision of gaps between the arcuate divider wall sections results in the formation of connecting dough webs which connect adjacent dough rings to one another.

Another aspect of the present invention relates to the extrusion die per se, which is comprised of a dough inlet comprising a plurality of metering passages arranged in concentric circles, a die interior comprised of a dough passageway containing a plurality of arcuate divider walls arranged in concentric circles, each of said arcuate divider walls comprised of a base portion affixed to said dough inlet and a tip portion that is recessed from a dough exit port.

DETAILED DESCRIPTION

Figure 1:
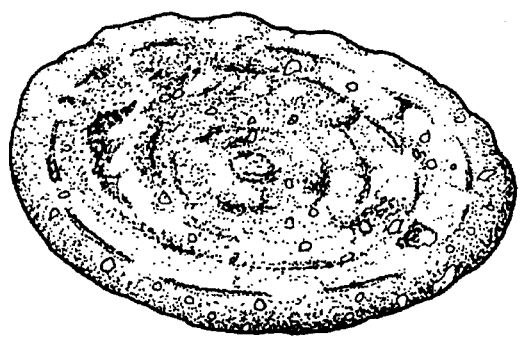
FIG. 1 is a perspective view of a pretzel chip produced according to this invention.
Figure 2:
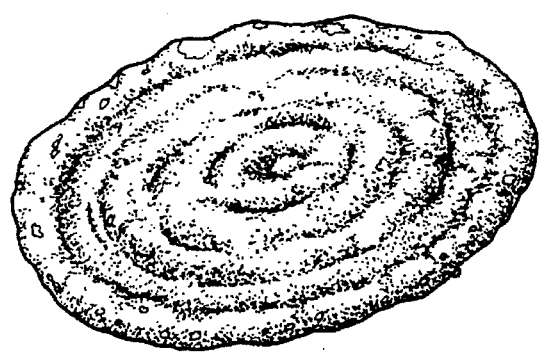
FIG. 2 is a perspective view of a pretzel chip produced according to this invention, wherein the view is from the opposite side of the chip illustrated in FIG. 1.
Figure 3:
FIG. 3 is a side view of a pretzel chip produced according to this invention.

The pretzel chip produced by the present process combines the advantages and attributes of a chip-shaped snack food product with the desired appearance, taste and texture of a pretzel. The chips are seen in FIGS. 1–3 and are thin, crispy and substantially flat, with a brown color typical of other pretzel shapes. Importantly, the process provides a pretzel chip that is strong enough to withstand the physical rigors of commercial packaging and transport operations, arriving to the consumer intact.

The dough employed to prepare pretzel chips according to this invention includes ingredients typically found in doughs for preparing snack food pretzels. These ingredients include enriched wheat flour, water, vegetable oil, corn syrup, salt, malt extract, yeast and sodium and ammonium bicarbonate. The dough also includes maltodextrins, which provide binding properties to the dough and result in reduced breakage of the final product during shipping. As is known to those skilled in this field, relative amounts of these (and other) ingredients can be varied to provide final product attributes as desired. Although the use of a wheat flour-based dough is typical in the preparation of pretzels, and is preferred in the present invention, doughs based on other flour types could be used.

The dough is prepared and mixed in the typical fashion in a mixer, and then is transferred to an extruder to be extruded through a die as illustrated and described herein. The dough extrudate is sliced into relatively thin slices which then are processed and cooked in typical pretzel-making fashion. The slices are par-cooked in a caustic hot water bath and then transferred to an oven or a series of ovens for baking and drying. The par-cooked slices can be salted as desired prior to baking, and the entire cooking process can be carried out using conventional commercial-scale, preferably automated, pretzel making apparatus.

Figure 5:
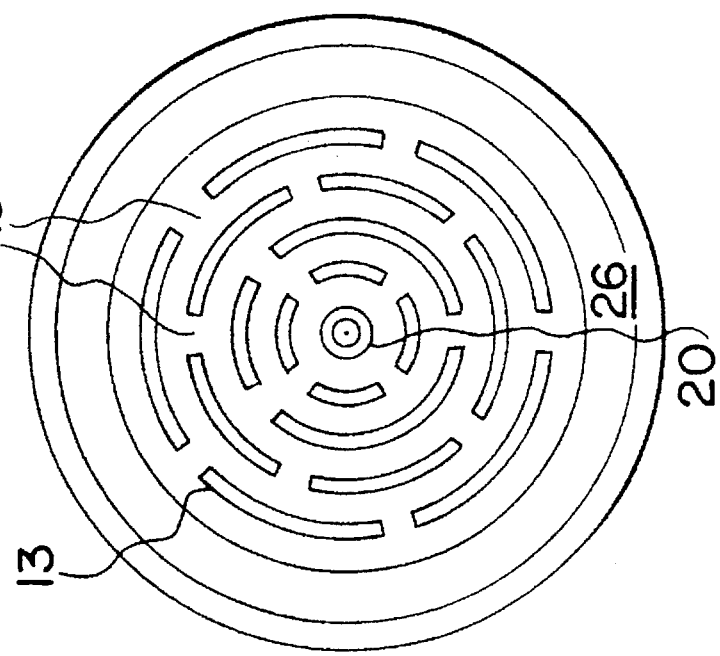
FIG. 5 is view of the front of the extrusion die of FIG. 4, showing arcuate divider walls disposed in a concentric circular pattern in the interior of the die, and with the metering passages tom shown (for clarity).
Figure 4:
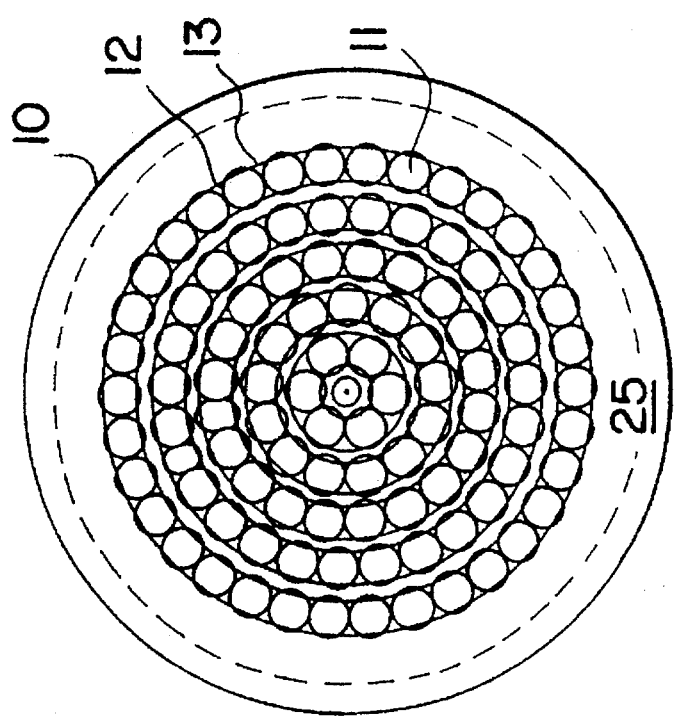
FIG. 4 is a view of the rear of an extrusion die used in the process according =s this invention, showing a plurality of metering passages disposed in concentric circles.

As seen in FIGS. 4 and 5, the die 10 which is employed in the present process has a dough entry port 25 comprising a plurality of metering passages 11 through which dough enters the interior of the die. The metering passages are arranged in concentric circles 12. The number of metering passages in the circles depends on the size of the desired chip and the size of the extrusion die. A preferred embodiment of the die, as seen in FIG. 4, has five concentric circles of metering passages, with the diameter of the passages in the outermost circle being slightly larger than the diameters of the remaining passages.

As illustrated in FIGS. 4 and 5, the circular layout of the metering passages corresponds generally to a concentric circular layout of arcuate divider walls 13 which are disposed in the interior of the die and extend generally to dough exit port 26 on the front of the die. The arcuate divider walls 13 are separated by web-forming slots 15. Thus, the extrusion of pretzel dough under pressure through the die results in a dough extrudate characterized by concentric rings of pretzel dough formed around arcuate walls 13, with each ring being connected to an adjacent ring by at least one dough web formed within slots 15.

In a preferred embodiment of die 10, the metering passages of the outermost concentric circle are larger in diameter than the other metering passages. The Larger-diameter passages provide increased flow of dough through the die and to the outer edge of the resulting chip, producing a pretzel chip which has a reinforced edge and therefore is less likely to break during packaging or transport.

Figure 6:
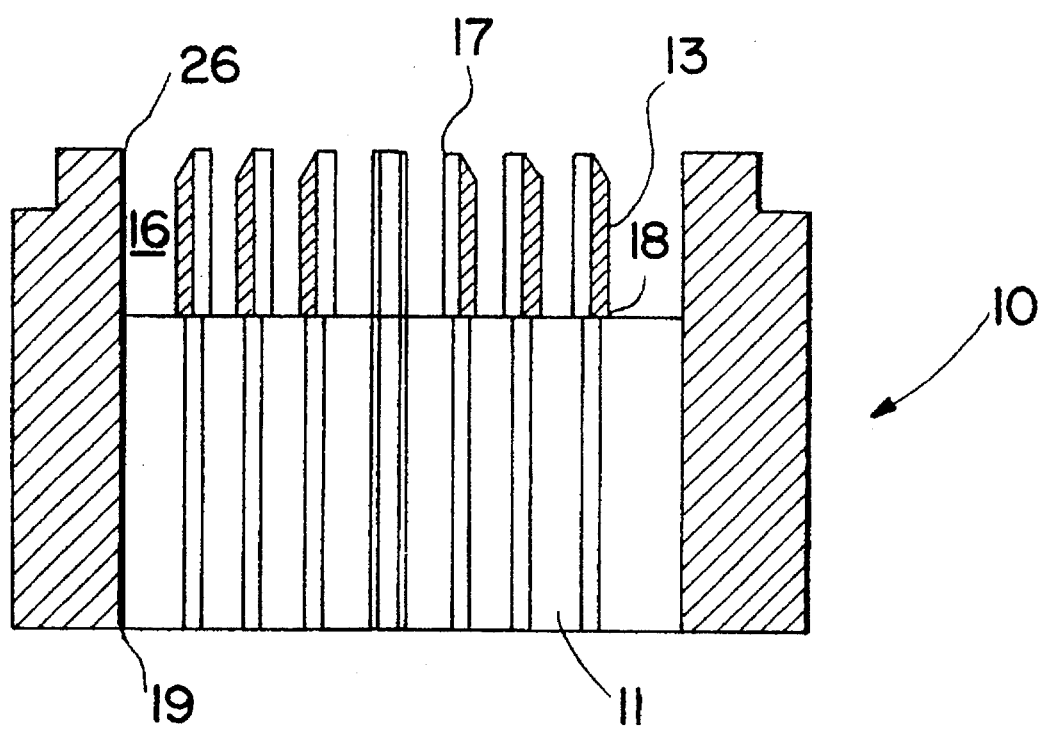
FIG. 6 is a sectional view of the extrusion die of FIGS. 4 and 5.

All of the concentric circles of arcuate divider walls preferably have tapered cross sections, as can be seen in FIG. 6. The thickness of the walls is greatest at the bases thereof and is reduced at the ends of the walls adjacent the dough exit port. The tapered divider walls form a path for the dough which increases in width in the direction in which the dough is flowing, that is, towards the exit port of the die. This feature also contributes to the overall strength and resistance to breakage of the finished product.

The actual dimensions of the extrusion die 10 and its various features, e.g., the diameter of the metering passages and the dimensions of the divider walls, can be varied. The ultimate dimensions chosen will depend upon the size and thickness of the desired product, the adjustments of which are well within the knowledge of those skilled in the art.

In a preferred embodiment, the extrusion die has an overall thickness of 0.58" The metering channels are 7/16" long and have diameters in the range of 5/32" to 3/16". As mentioned above, the diameters of the metering passages in the outer concentric circle preferably have a diameter which is larger then the diameter of the metering passages of the other concentric circles. Thus, a preferred arrangement includes an outer circle of metering passages having 3/16" diameters with the remaining metering passages having 5/32" diameters.

The dough exit port of the preferred embodiment comprises a 1/8" diameter center channel 20 and 1/8" wide and 1/8" deed arcuate divider walls. Divider walls in the preferred embodiment are separated by a 0.055" wide web, with the height of each web equal to the depth of the divider wall.

As seen in FIG. 6, the arcuate divider walls are disposed within the interior 16 of the die 10. The outermost edges or tip portions 17 of the divider walls are very slightly recessed from the edge of exit port 26. A recessed distance of 0.0005 inches is sufficient to ensure that the edges 17 will not interfere with the action of the knife that is used to slice the dough slices from the die. The base portions 18 of the arcuate divider walls are affixed to the structure of the dough inlet 19.

The preferred web-forming slots which separate adjacent divider walls are 1/8" wide and 1/8 deep. As discussed above, these slots provide dough which interconnects the concentric dough rings.

The arrangement of the metering channels and divider walls of the die are designed so that dough passes into the interior of the die under pressure. As a result, the dough expands to completely fill the interior of the die.

The extrudate is sliced from the die opening using conventional slicing technology. A Teflon®-coated knife blade is suitable, for example. The sliced dough pieces then are transferred by conventional equipment to a caustic hot water bath pretzel cooker, following which the par-cooked slices are salted and then baked, again via conventional equipment and technology.

The dough slices are cooked under conditions typically employed to produce pretzels, namely, immersion in a caustic soda bath followed by baking. The bath typically includes about 1.4 to about 1.6 percent (preferably 1.5) by weight caustic (NaOH). The temperature of the bath can be between 175° F. and 195° F., preferably 180° F. The residence time of the raw pretzel chips (dough slices) in the caustic bath preferably is between 8 and 10 seconds.

Following removal from the caustic bath, the par-cooked slices are salted, baked and then dried. A preferred baking procedure is carried out as a three-zone baking process. The par-cooked slices preferably are transported as a mono-layer through three oven zones maintained at a 550° F. average temperature for a total baking time of approximately four minutes. The baked chips then are passed through a three-zone drying process wherein each of the drying zones is maintained at an average temperature of approximately 275° F., for a total drying time of about seven to nine minutes.

The resulting pretzel chips are permitted to cool and then are packaged using conventional snack food packaging techniques. If desired, the cooled chips can be seasoned using conventional snack food seasoning apparatus (for example a rotating tumbler) prior to packaging.

Although the present invention has been described in connection with certain preferred embodiments, it is not so limited. Modifications to this technology within the spirit and scope of the Claims will be apparent to those skilled in this field.

What is claimed is:

1. An extrusion die comprising a dough inlet comprised of a plurality of metering passages arranged in concentric circles, a die interior comprised of a dough passageway containing a plurality of arcuate divider walls arranged in concentric circles, each of said arcuate divider walls comprised of a base portion affixed to said dough inlet and a tip portion that is recessed from a dough exit port.

2. An extrusion die for extruding material, the die comprising:
   an inlet including a plurality of concentric rings of metering passages, each of said concentric rings including a plurality of individual metering passages through which a material passes;

an outlet disposed away from the inlet through which the material exits the extrusion die;

a plurality of divider walls arranged in a plurality of concentric circles disposed between the inlet and the outlet of the extrusion die, each of said concentric circles including a plurality of adjacent individual divider walls, the adjacent individual divider walls of each concentric circle being separated by gaps;

whereby the material passes into the inlet and through the plurality of concentric rings of metering passages, past the plurality of individual divider walls and through the gaps between adjacent divider walls, and out of the outlet to form an extrudate including a plurality of concentric rings of material which are partially fused together.

3. An extrusion die according to claim 2, wherein the metering passages are circular in cross-section.

4. An extrusion die according to claim 2, wherein the metering passages in an outermost one of the concentric rings are larger than the metering passages in at least one of an inner concentric ring.

5. An extrusion die according to claim 2, wherein at least some of the individual divider walls are arcuate in cross-section.

6. An extrusion die according to claim 5, wherein at least some of the individual arcuate divider walls are tapered so as to be larger at a portion thereof affixed to the metering passages than at a tip portion thereof disposed adjacent to the die outlet.

7. An extrusion die according to claim 6, wherein the tip portions of the individual arcuate divider walls are recessed from the die outlet.

8. An extrusion die according to claim 2, wherein the individual divider walls in a given concentric circle have substantially the same length.

9. An extrusion die according to claim 2, further comprising an outer wall surrounding the inlet and the outlet of the die.

10. An extrusion die for extruding dough material, the die comprising:

an inlet including a plurality of concentric rings of metering passages, each of said concentric rings including a plurality of individual metering passages extending away from the inlet, the metering passages having a circular cross-section through which the dough material passes;

wherein the metering passages in an outermost one of the concentric rings are larger than the metering passages in at least one of an inner concentric ring;

an outlet disposed opposite the inlet through which the dough material exits the extrusion die;

a plurality of arcuate divider walls arranged in a plurality of concentric circles, the divider walls including a base disposed adjacent the metering passages and a tip portion disposed adjacent the die outlet, the tip portion being recessed from the die outlet, each of said concentric circles including a plurality of adjacent arcuate individual divider walls separated by gaps;

whereby the dough material is extruded through the plurality of concentric rings of metering passages and past the plurality of individual divider walls to form an extrudate including a plurality of rings of dough material which are partially fused together.

* * * * *